United States Patent
Kim et al.

(10) Patent No.: US 7,729,247 B2
(45) Date of Patent: Jun. 1, 2010

(54) VOICE OVER INTERNET PROTOCOL (VOIP) DOWNLINK PACKET SCHEDULING APPARATUS AND METHOD IN A MOBILE COMMUNICATION BASE STATION (BS) SYSTEM

(75) Inventors: Jae-Young Kim, Yongin-si (KR); Han-Seok Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 616 days.

(21) Appl. No.: 11/653,765

(22) Filed: Jan. 16, 2007

(65) Prior Publication Data
US 2007/0189262 A1 Aug. 16, 2007

(30) Foreign Application Priority Data
Jan. 16, 2006 (KR) ...................... 10-2006-0004246

(51) Int. Cl.
*H04L 12/26* (2006.01)
*H04L 1/00* (2006.01)

(52) U.S. Cl. ..................... 370/230; 370/231; 370/235; 370/508

(58) Field of Classification Search ................. 370/276, 370/277, 282, 310, 310.1, 310.2, 328, 229, 370/230–238.1, 508
See application file for complete search history.

(56) References Cited

U.S. PATENT DOCUMENTS

| 6,272,132 B1 * | 8/2001 | Ofek et al. ............... 370/389 |
| 6,360,271 B1 * | 3/2002 | Schuster et al. ........... 709/231 |
| 2003/0058792 A1 * | 3/2003 | Shao et al. ............... 370/229 |
| 2006/0268713 A1 * | 11/2006 | Lundstrom ................ 370/235 |

FOREIGN PATENT DOCUMENTS

| JP | 2002-217959 | 8/2002 |
| KR | 1020000047034 | 7/2000 |
| KR | 1020030060027 | 7/2003 |
| KR | 1020040108244 | 12/2004 |

* cited by examiner

*Primary Examiner*—Rafael Pérez-Gutiérrez
*Assistant Examiner*—Neda Behrooz
(74) *Attorney, Agent, or Firm*—The Farrell Law Firm, LLP

(57) ABSTRACT

A VoIP downlink packet scheduling apparatus and method in a mobile communication Base Station (BS) system are provided. The downlink packet scheduling apparatus includes a packet queue for storing a downlink packet when the downlink packet is received; a downlink scheduler for selecting a packet stored to the packet queue under a certain condition and scheduling a corresponding packet according to whether a packet drop module determines to drop the selected packet; and the packet drop module calculates a transmission delay time of the packet, determines whether the transmission delay time of the packet meets a threshold, and determines whether to drop or transmit the corresponding packet according to whether the threshold is satisfied.

18 Claims, 4 Drawing Sheets

VOICE OVER INTERNET PROTOCOL (VOIP) DOWNLINK PACKET SCHEDULING APPARATUS AND METHOD IN A MOBILE COMMUNICATION BASE STATION (BS) SYSTEM

PRIORITY

This application claims priority under 35 U.S.C. §119 to an application filed in the Korean Intellectual Property Office on Jan. 16, 2006 and assigned Serial No. 2006-4246, the contents of which are incorporated herein by reference.

BACKGROUND OF THE INVENTION

1. Field of the Invention

The present invention relates generally to a mobile communication Base Station (BS) system, and in particular, to a Voice over Internet Protocol (VoIP) downlink packet scheduling apparatus and method.

2. Description of the Related Art

Recently, Voice over Internet Protocol (VoIP) service, which has been applied mostly to wired networks, has been adapted to wireless networks. The wireless networks are subject to expensive radio channels and low throughput, as compared to wired networks. Accordingly, it is advantageous to utilize the radio channel at maximum efficiency.

VoIP service requires real-time Quality of Service (QoS) which is not sensitive to losses, but very sensitive to packet delay time. VoIP service can retain the QoS of a user in the event of packet loss below a certain rate. Hence, it is important for the VoIP service to deliver the packet to a corresponding Mobile Station (MS) in time at the cost of packet loss.

A conventional mobile communication Base Station (BS) system fundamentally carries all of the received VoIP packets. Thus, the conventional mobile communication BS system has to deliver the VoIP packet even if the VoIP packet may be delayed in the system due to instantaneous throughput degradation based on the characteristic of the radio channel. In case where the packet is not transmitted but buffered to a system buffer, the packet is stored up to the buffer upperbound capacity and the following VoIP packet is dropped. Hence, the delayed packet adversely affects the following packet.

Generally, when transmitting the VoIP packet over the wireless network, the conventional system may request oversubscription above a link capacity using a statistical multiplex scheme so as to efficiently utilize the limited radio resources. In doing so, the VoIP traffic over the link capacity may be loaded at a certain time. Consequently, the conventional system is subject to a frequent instantaneous bottleneck within the BS.

SUMMARY OF THE INVENTION

An object of the present invention is to substantially solve at least the above problems and/or disadvantages and to provide at least the advantages below. Accordingly, an object of the present invention is to provide a Voice over Internet Protocol (VoIP) downlink packet scheduling apparatus and method in a mobile communication Base Station (BS) system.

The above aspects are achieved by providing a downlink packet scheduling method in a mobile communication BS system, which includes calculating, when receiving a downlink packet, a network transmission delay time using a difference between a BS arrival time of the downlink packet and a timestamp value of the downlink packet generation; calculating, when the packet is a packet to be currently scheduled, a queuing delay time using a difference between a BS departure time of the packet and the BS arrival time; calculating a packet transmission delay time using a sum of the calculated network transmission delay time and the calculated queuing delay time; and checking whether the calculated packet transmission delay time meets a threshold, determining to send a corresponding packet when the packet transmission delay time meets the threshold, and determining to drop a corresponding packet when the packet transmission delay time does not meet the threshold.

According to another aspect of the present invention, a downlink packet scheduling apparatus in a mobile communication BS system includes a packet queue for storing a downlink packet when the downlink packet is received; a downlink scheduler for selecting a packet stored in the packet queue under a certain condition and scheduling a corresponding packet according to whether a packet drop module determines whether to drop the selected packet; and the packet drop module for calculating a transmission delay time of the packet, determining whether the transmission delay time of the packet meets a threshold, and determining whether to drop or transmit the corresponding packet according to whether the threshold is satisfied.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a Voice over Internet Protocol (VoIP) downlink packet scheduling apparatus and method in a mobile communication Base Station (BS) system. While the present invention exemplifies a VoIP service, any other service having QoS can be adopted.

Figure 1:
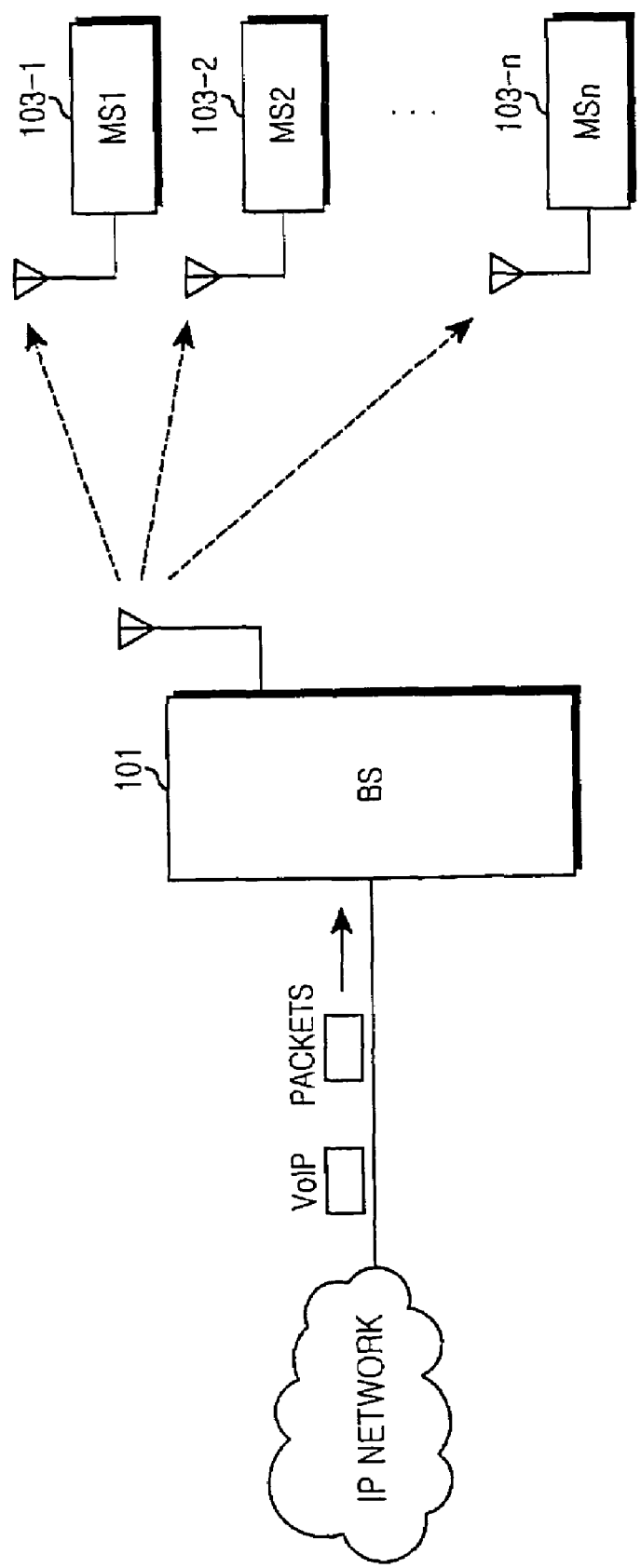
FIG. 1 illustrates a structure of a mobile communication network for providing a VoIP service according to the present invention.

FIG. 1 illustrates a structure of a mobile communication network for providing a VoIP service according to the present invention.

Referring first to FIG. 1, BS 101 receives VoIP packets destined for Mobile Stations (MSs) 103-1 through 103-$n$ from an IP backbone network, schedules the received VoIP packets, and then sends the scheduled VoIP packets to the respective MSs 103-1 through 103-n. The MSs 103-1 through 103-n receive the VoIP packets via the BS 101.

Figure 2:
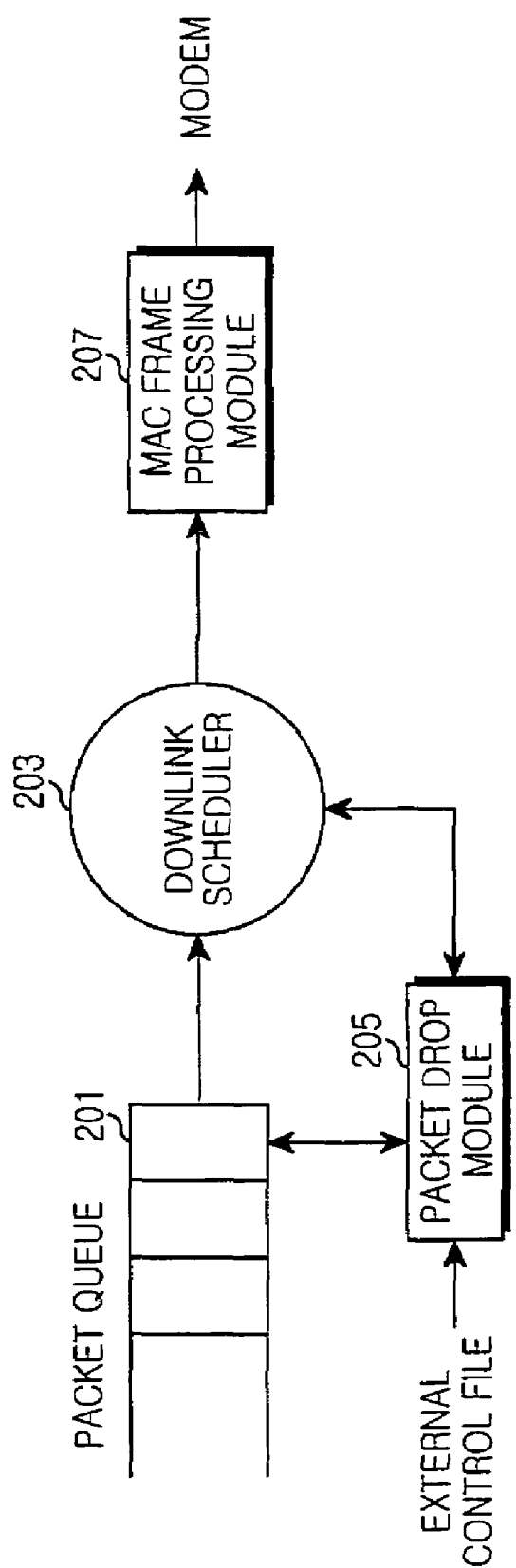
FIG. 2 illustrates a configuration of a VoIP downlink packet scheduling apparatus in a mobile communication BS system according to the present invention.

FIG. 2 illustrates a configuration of a VoIP downlink packet scheduling apparatus in a mobile communication BS system according to the present invention. The VoIP downlink packet scheduling apparatus includes a packet queue 201, a downlink scheduler 203, a packet drop module 205, and a Media Access Control (MAC) frame processing module 207.

Referring to FIG. 2, the packet queue 201 stores VoIP packets transmitted from the IP backbone network to the BS.

The downlink scheduler 203 selects one of the VoIP packets stored in the packet queue 201 on various bases such as radio channel conditions, multiple access schemes, and QoS parameters, and checks whether to drop the packet by calling a function of the packet drop module 205 for the selected packet. Depending on the determination of the packet drop module 205, the downlink scheduler 203 drops or applies the packet to the MAC frame processing module 207.

The packet drop module 205, which is located between the packet queue 201 and the downlink scheduler 203, calculates a network transmission delay time using a difference between a timestamp value contained in a Real-time Transport Protocol (RTP) header of the VoIP packet to be scheduled and an arrival time of the VoIP packet at the BS. The packet drop module 205 calculates a queuing delay time using a difference between the BS arrival time and the BS departure time, and calculates a transmission delay time of the currently scheduled VoIP packet using the sum of the calculated network transmission delay time and the calculated queuing delay time. Also, the packet drop module 205 checks whether the transmission delay time of the packet meets a transmission delay time threshold which is predefined in an external control file. When the transmission delay time of the packet meets the threshold, the packet drop module 205 instructs the downlink scheduler 203 to perform normal scheduling and downlink processing on the corresponding packet. In contrast, when the transmission delay time of the packet does not meet the threshold, the packet drop module 205 removes the corresponding packet from the packet queue 201 in advance and informs the downlink scheduler 203 of non-scheduling on the corresponding packet. Herein, the external control file is dynamically changeable depending on necessity and determination of the downlink scheduler 203 so as to adapt to the radio link and packet transmission conditions. When the calculated transmission delay time does not meet the threshold, the packet drop module 205 may read a loss probability value of the corresponding packet from the external control file, and selectively drop the corresponding packet according to the read probability value. For instance, in the case of extra resources even with a high loss probability value, the packet drop module 205 can schedule the packet, rather than dropping it.

The MAC frame processing module 207 processes the packet received from the downlink scheduler 203, through header compression and MAC frame generation, and then outputs the processed packet to a Modulator and Demodulator (MODEM).

Figure 3:
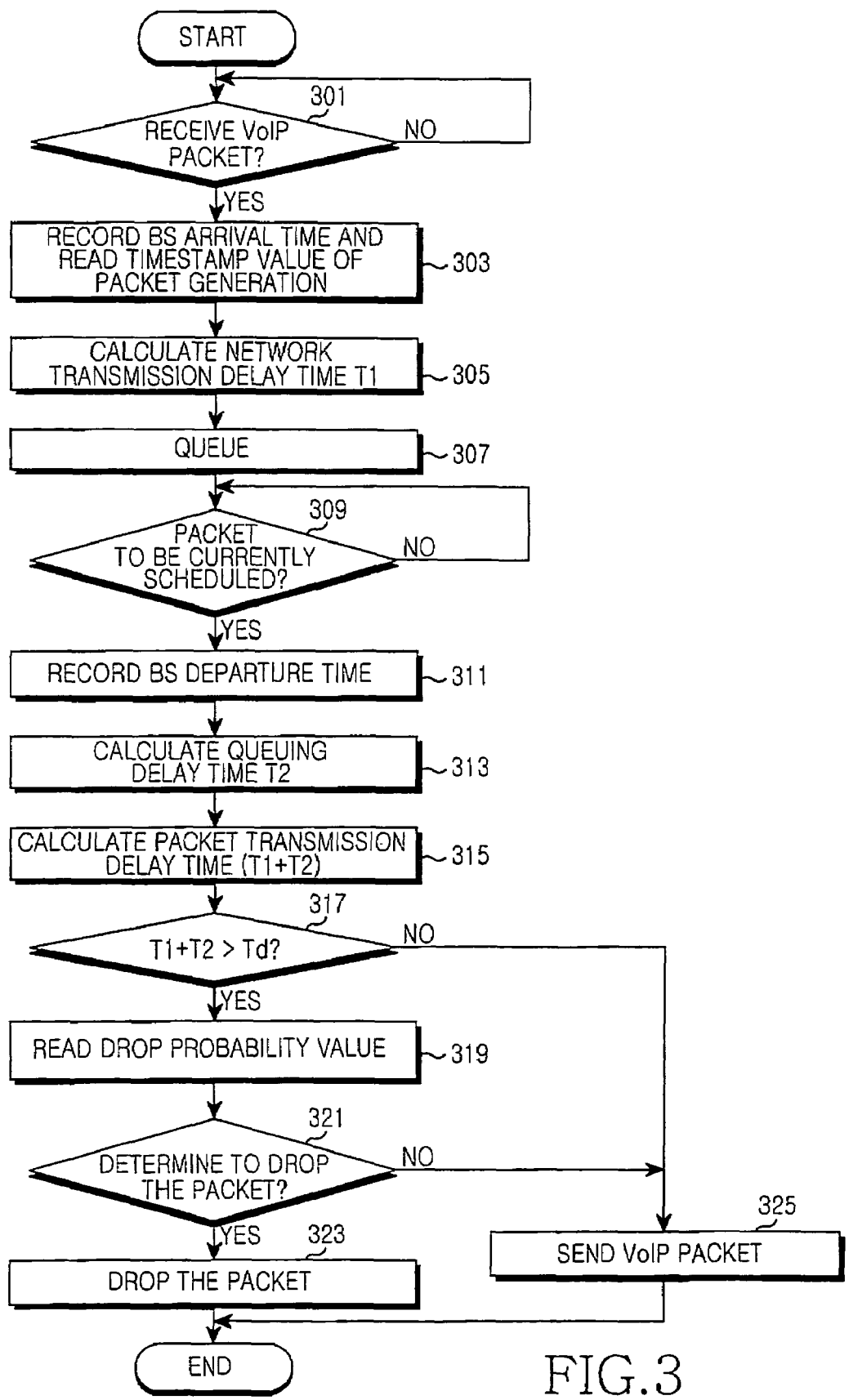
FIG. 3 is a flowchart showing a VoIP downlink packet scheduling procedure in a mobile communication BS system according to the present invention.

FIG. 3 is a flowchart showing a VoIP downlink packet scheduling procedure in a mobile communication BS system according to the present invention.

Referring to FIG. 3, the BS system checks whether a VoIP packet is received over the IP network in step 301. Upon the arrival of the VoIP packet, the BS system records an arrival time of the VoIP packet and reads a timestamp value of the packet generation from the RTP header of the VoIP packet in step 303. Herein, the RTP is a transport layer communication protocol for transmitting and receiving voice and calls in real time, and the RTP header contains information according to the transmitted packet order (sequence number) and information relating to the packet generation time (timestamp).

Next, in step 305, the BS system calculates a network transmission delay time T1 using the difference between the BS arrival time and the timestamp value of the VoIP packet generation. Since clock references of the VoIP packet generation system and the BS system may differ from each other, T1 should be considered as a relative time, not absolute time, so as to detect the difference between the packets. In step 307, the BS system queues the corresponding VoIP packet for scheduling.

In step 309, the BS system checks whether the packet is a packet to be currently scheduled. When the packet is to be currently scheduled, the BS system records the current time; that is, the BS departure time in step 311 and calculates a queuing delay time T2 using the difference between the BS departure time and the BS arrival time of the VoIP packet in step 313.

Next, the BS calculates the packet transmission delay time using the sum of the network transmission delay time T1 and the queuing delay time T2 in step 315 and checks whether the calculated packet transmission delay time of the corresponding packet is greater than a transmission delay time threshold Td in step 317; that is, checks whether the corresponding VoIP packet meets the transmission delay time. Herein, the criterion to check whether the transmission delay time is satisfied is prescribed in the external control file and is adjustable.

When the calculated transmission delay time of the corresponding packet is greater than the transmission delay time threshold Td; that is, when the corresponding VoIP packet does not meet the transmission delay time, the BS system reads a packet drop probability value from the external control file in step 319 and determines whether to drop the packet in step 321. Herein, the external control file contains the packet loss probability value according to the transmission delay time. The BS is able to stochastically drop the packet which passed the transmission delay time, according to a manager parameter recorded in the external control file. The probability value is selected from [0, 1]. When the probability value is '0', the transmission of the corresponding packet is determined unconditionally. When the probability value is '1', the drop of the corresponding packet is determined unconditionally. In the event of the probability value ranging from '0' to '1', the packet drop is determined in accordance with the rate of the probability value.

Upon determining to drop the packet, (that is, upon determining that the corresponding packet cannot meet the transmission delay time threshold and is to be stochastically dropped), the BS system drops the corresponding packet in step 323. When the packet drop is not determined in step 321 or the calculated packet transmission delay time of the corresponding packet is not greater than the transmission delay time threshold Td in step 317, the BS system sends the corresponding VoIP packet to the corresponding MS in step 325 and then terminates the process of the present invention.

Figure 4:
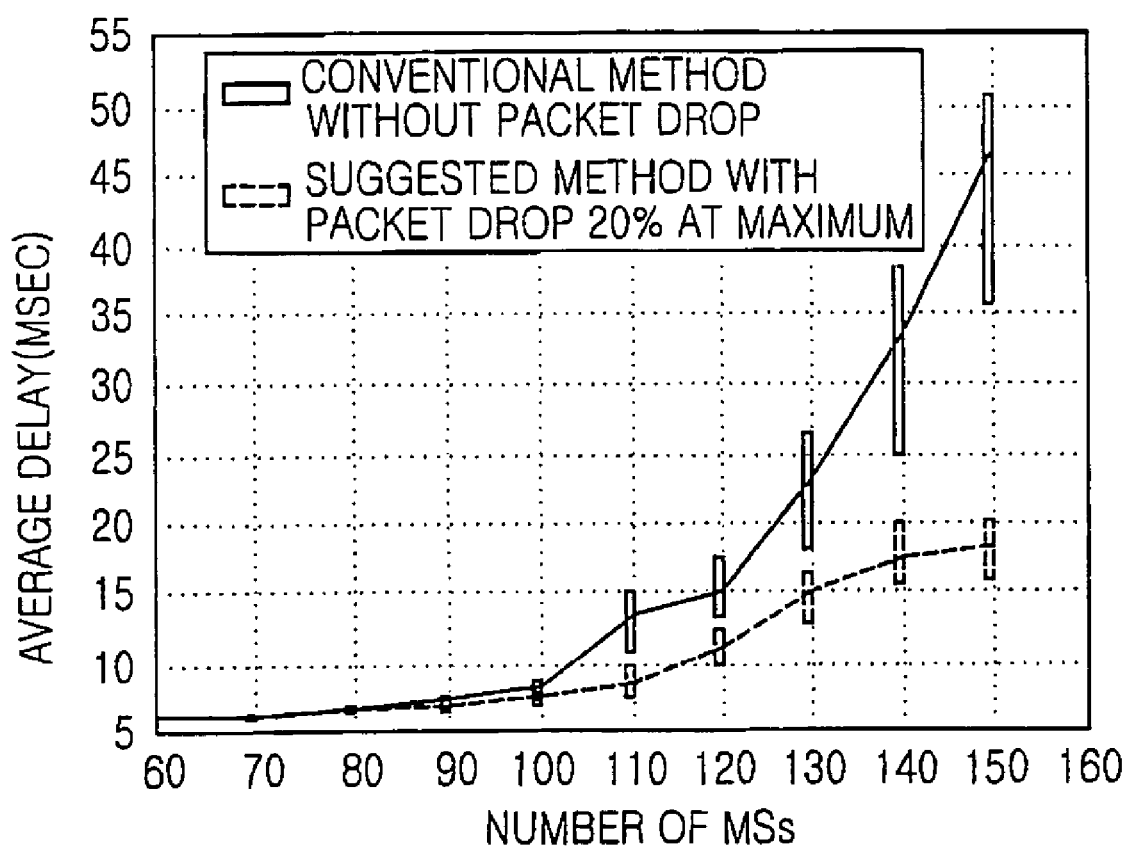
FIG. 4 is a graph showing a simulation result by comparing the conventional method without packet drop and the suggested method with packet drop. The maximum number of packets that can be dropped is set to 20% in the simulation.

FIG. 4 is a graph showing a simulation result by comparing the conventional method without the packet drop and the suggested method with packet drop. The maximum number of packets that can be dropped is set to 20% in the simulation. Herein the conventional method without the packet drop transmits every VoIP packet regardless of the delay time, and the packet drop method of 20% at maximum drops the packet at the scheduler of the BS up to 20% at maximum in the event of a delay over 10 msec.

Referring to FIG. 4, the simulation measures and compares the delay times taken for the transmission of the respective downlink VoIP packet from the BS to the MS, by comparing the average values of the VoIP packet transmission delay times while the BS with a fixed radio link capacity increases the number of MSs receiving the VoIP service. When the number of the MSs serviced in the BS increases and causes congestion while the BS services the same number of MSs, the suggested packet drop method can reduce the average transmission delay time of the VoIP packet by more than twice, compared to the conventional method. In other words, a large number of VoIP MSs can be serviced without degrading the QoS.

As set forth above, the VoIP downlink packet scheduling apparatus and method according to the present invention permits packet loss at a proper rate in advance by measuring the delay time starting from the delay initiation when the transmission delay of the VoIP packet results from various causes in the mobile communication BS system which transmits the VoIP packet. Therefore, the VoIP QoS can be enhanced and the VoIP processing capacity of the BS can be increased by avoiding the waste of the insufficient radio resources and reducing the transmission delay of the VoIP packet, rather than transmitting every packet all the time. Furthermore, while there is no delay within the BS, it is possible to pick out the VoIP packet which has suffered a delay already in the wired IP network prior to the arrival at the BS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A downlink packet scheduling method in a mobile communication base station (BS) system, the method comprising:
    calculating, when receiving a downlink packet, a network transmission delay time using a difference between a BS arrival time of the downlink packet and a timestamp value of the downlink packet at generation;
    calculating, when the packet is a packet to be currently scheduled, a queuing delay time using a difference between a BS departure time of the packet and the BS arrival time of the packet;
    calculating a packet transmission delay time using a sum of the calculated network transmission delay time and the calculated queuing delay time;
    checking whether the calculated packet transmission delay time meets a threshold, determining to send a corresponding packet when the packet transmission delay time meets the threshold, and determining to drop a corresponding packet when the packet transmission delay time does not meet the threshold; and
    determining, when the packet transmission delay time does not meet the threshold, to drop the corresponding packet based on a packet loss probability value according to the packet transmission delay time and selectively dropping the packet according to a result of the determination,
    wherein the packet drop is determined in accordance with a rate of the packet loss probability value.

2. The downlink packet scheduling method of claim 1, wherein the timestamp value of the downlink packet at generation is information contained in a Real-time Transport Protocol (RTP) header.

3. The downlink packet scheduling method of claim 1, wherein the network transmission delay time is a relative time.

4. The downlink packet scheduling method of claim 1, wherein the threshold is predefined in an external control file.

5. The downlink packet scheduling method of claim 1, wherein the packet loss probability value is predefined in an external control file.

6. The downlink packet scheduling method of claim 1, wherein, when the packet loss probability value is '0', transmission of the packet is determined, when the packet loss probability value is '1', the packet drop is determined and, in the event of the packet loss probability value ranging from '0' to '1', the packet drop is determined in accordance with the rate of the packet loss probability value.

7. A downlink packet scheduling apparatus in a mobile communication base station (BS) system, comprising:
    a packet queue for storing a downlink packet when the downlink packet is received;
    a downlink scheduler for selecting a packet stored in the packet queue and scheduling a corresponding packet according to whether a packet drop module determines to drop the selected packet; and
    the packet drop module for calculating a transmission delay time of the packet, determining whether the transmission delay time of the packet meets a threshold, and determining whether to drop or transmit the corresponding packet according to whether the threshold is satisfied,
    wherein the packet drop module determines whether to drop a corresponding packet based on a packet loss probability value according to the packet transmission delay time, and selectively drops the packet according to a result of the determination when the packet transmission delay time does not meet the threshold,
    wherein the packet drop is determined in accordance with a rate of the packet loss probability value.

8. The downlink packet scheduling apparatus of claim 7, wherein the packet transmission delay time is a sum of a network transmission delay time and a queuing delay time.

9. The downlink packet scheduling apparatus of claim 8, wherein the network transmission delay time is calculated using a difference between a BS arrival time of the packet and a timestamp value of the packet at generation.

10. The downlink packet scheduling apparatus of claim 9, wherein the timestamp value of the packet at generation is information contained in a Real-Time transport Protocol (RTP) header.

11. The downlink packet scheduling apparatus of claim 8, wherein the queuing delay time is calculated using a difference between a BS departure time and a BS arrival time of the packet.

12. The downlink packet scheduling apparatus of claim 7, wherein the packet is stored in the packet queue based on at least one of a radio channel condition, a multiple access scheme, and a Quality of Service (QoS) parameter.

13. The downlink packet scheduling apparatus of claim 7, wherein the threshold is predefined in an external control file.

14. The downlink packet scheduling apparatus of claim 13, wherein the external control file contains a packet loss probability value according to the packet transmission delay time.

15. The downlink packet scheduling method of claim 7, wherein the packet loss probability value is predefined in an external control file.

16. The downlink packet scheduling method of claim 7, wherein, when the packet loss probability value is '0', transmission of the packet is determined, when the packet loss probability value is '1', the packet drop is determined and, in the event of the packet loss probability value ranging from '0' to '1', the packet drop is determined in accordance with the rate of the packet loss probability value.

17. A downlink packet scheduling method in a mobile communication system, the method comprising:
- calculating a network transmission delay time of a downlink packet;
- calculating a queuing delay time of the downlink packet;
- calculating a packet transmission delay time using a sum of the calculated network transmission delay time and the calculated queuing delay time;
- determining to send or drop a corresponding packet by checking whether the calculated packet transmission delay time meets a threshold; and
- determining, when the packet transmission delay time does not meet the threshold, to drop the corresponding packet based on a packet loss probability value according to the packet transmission delay time and selectively dropping the packet according to a result of the determination,
- wherein the packet drop is determined in accordance with a rate of the packet loss probability value.

18. A downlink packet scheduling apparatus in a mobile communication system, comprising:
- a packet queue for storing a downlink packet when the downlink packet is received; and
- a packet drop module for calculating a network transmission delay time of a downlink packet,
for calculating a queuing delay time of the downlink packets,
for calculating a packet transmission delay time using a sum of the calculated network transmission delay time and the calculated queuing delay time, and
for determining to send or drop a corresponding packet by checking whether the calculated packet transmission delay time meets a threshold,
- wherein the packet drop module determines whether to drop a corresponding packet based on a packet loss probability value according to the packet transmission delay time, and selectively drops the packet according to a result of the determination when the packet transmission delay time does not meet the threshold,
- wherein the packet drop is determined in accordance with a rate of the packet loss probability value.

* * * * *